June 19, 1928.

G. W. LITTLEHALES 1,673,836

MECHANICAL MEANS FOR USE IN FINDING GEOGRAPHICAL POSITION IN NAVIGATION

Filed May 24, 1926   2 Sheets-Sheet 1

Inventor:
George W. Littlehales,

June 19, 1928.  G. W. LITTLEHALES  1,673,836
MECHANICAL MEANS FOR USE IN FINDING GEOGRAPHICAL POSITION IN NAVIGATION
Filed May 24, 1926   2 Sheets-Sheet 2
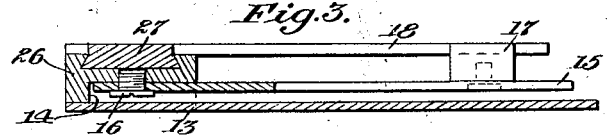
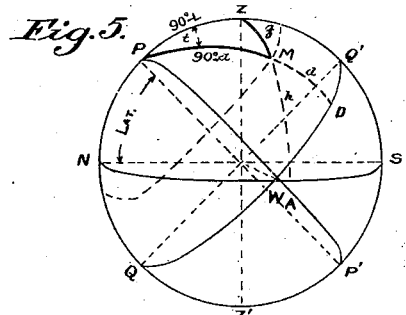
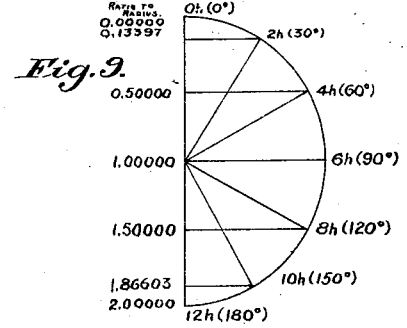
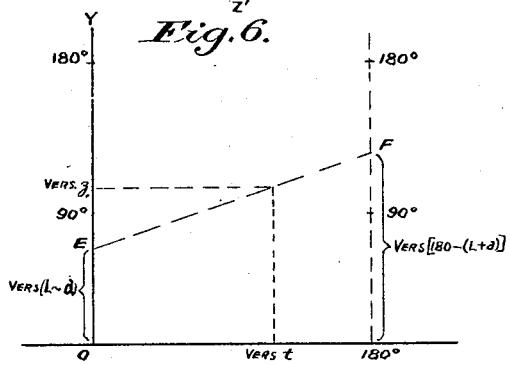
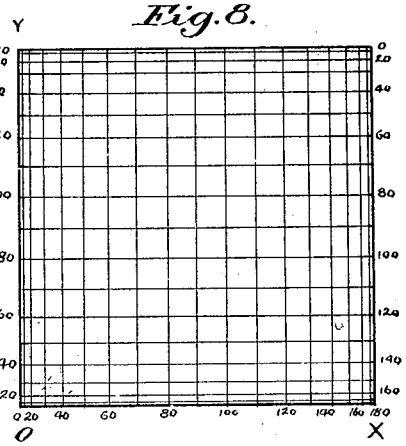
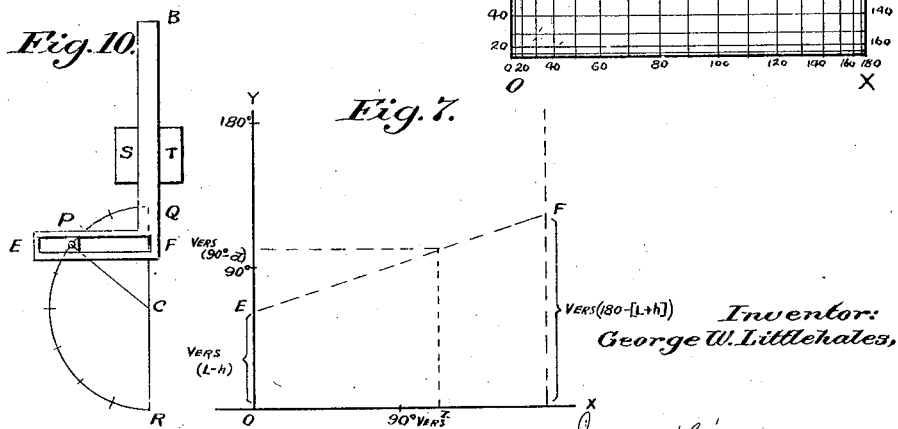
Inventor:
George W. Littlehales, Patented June 19, 1928.

1,673,836

UNITED STATES PATENT OFFICE.

GEORGE W. LITTLEHALES, OF WASHINGTON, DISTRICT OF COLUMBIA.

MECHANICAL MEANS FOR USE IN FINDING GEOGRAPHICAL POSITION IN NAVIGATION.

Application filed May 24, 1926. Serial No. 111,421.

This invention relates to mechanical means for use in finding geographical position in navigation, and it comprises an instrument for solving spherical triangles, especially the astronomical triangle and the terrestrial triangles employed in navigation.

It is the principal object of my invention to provide an instrument by which the elements for determining geographical position in the practice of navigation can be found quickly and with but little mental effort, by eliminating the necessity for the solution of mathematical equations.

A further object is the provision of an instrument of simple, durable, and compact construction which is adaptable to aerial as well as marine navigation.

Other and further objects will be apparent from the following description and drawings, in which Figure 1 is a plan view of the instrument comprising the present invention;

Figure 3 is a sectional view taken along the line 3—3 of Figure 1;

Figure 4 is a sectional view taken along the line 4—4 of Figure 1;

Figure 5 illustrates the usual notation of the astronomical triangle;

Figure 6 represents the method of showing the relation of the parts of a spherical triangle and in the fundamental equation (equation 10) with reference to Cartesian coordinates whose abscissæ and ordinates are the versines of angles ranging from 0° to 180°;

Figure 7 is of like nature with Figure 6, being a graphical representation of equation (12);

Figure 8 represents the first quadrant of the system of Cartesian rectangular coordinates with ordinates drawn from the points of subdivision of the scale of versines of angles ranging from 0° to 180°, on the axis of the abscissæ OX and on the axis of the ordinates OY;

Figure 9 is a graphical representation of a method of determining the versines of angles throughout a range of from 0° to 180° by movement of a radius of a circle about the center thereof;

Figure 10 is a diagrammatic illustration of the means which I employ for mechanically producing movements according to the law of versines of angles throughout a range of from 0° to 180°.

Figure 1:
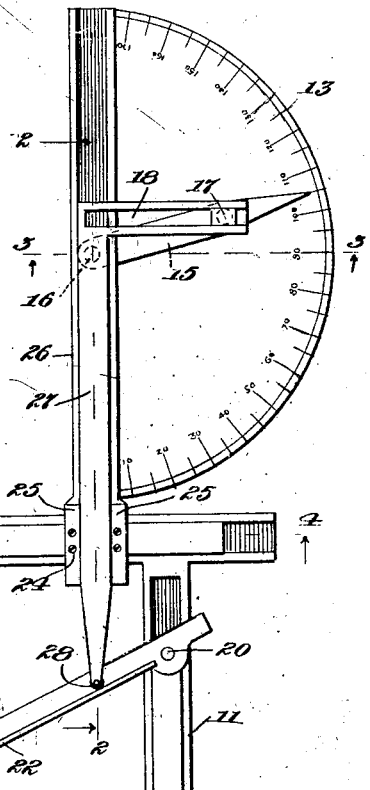
Figure 2:
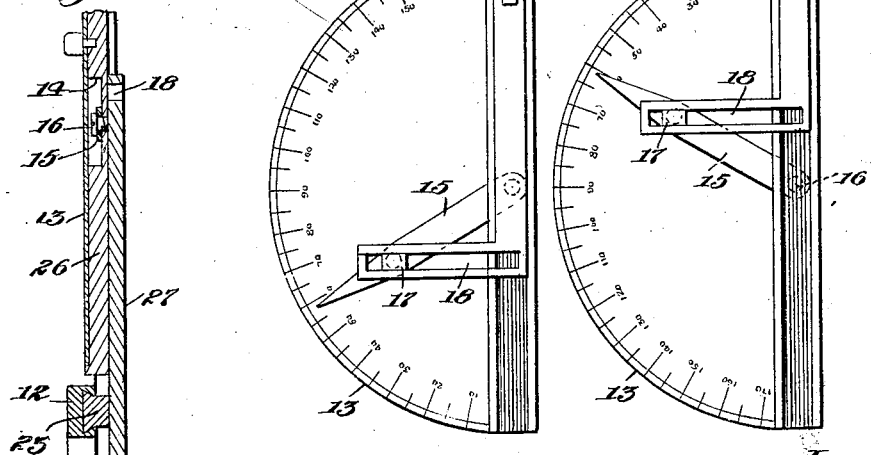
Figure 2 is a sectional view taken along the line 2—2 of Figure 1.

Referring to the drawings, and more particularly Figures 5 to 10 thereof, in explanation of the principles underlying my invention:

The fundamental relation between the arcs representing the three sides of a spherical triangle and the angle between two of them is generally expressed by trignometers in the following form $$\cos a = \cos b \cos c + \sin b \sin c \cos A \quad (1)$$

in which $a$, $b$, and $c$ represent the sides and $A$ the angle opposite the side $a$. This relation with reference to the other angles of the spherical triangle, i. e., the angle $B$ opposite to the side $b$, and the angle $C$ opposite to the side $c$, can likewise be expressed by cyclical transposition of the letters in the usual manner; and similarly, from the polar triangle, comes the expression $$\cos A = \cos B \cos C + \sin B \sin C \cos a$$

If, in place of cos A, in equation (1), its equivalent $1 - 2 \sin^2 \tfrac{1}{2} A$ be introduced, the expression becomes $$\cos a = \cos b \cos c + \sin b \sin c \, (1 - 2 \sin^2 \tfrac{1}{2} A) \quad (2)$$

or $$\cos a = \cos b \cos c + \sin b \sin c - 2 \sin^2 \tfrac{1}{2} A \sin b \sin c \quad (3)$$

or, since $$\cos b \cos c + \sin b \sin c = \cos (b-c),$$
$$\cos a = \cos (b-c) - 2\sin^2 \tfrac{1}{2} A \sin b \sin c \quad (4)$$

and, since $$2 \sin^2 \tfrac{1}{2} A = \text{versin } A,$$
$$\cos a = \cos (b-c) - \text{versin } A \sin b \sin c \quad (5)$$

Subtracting both sides of the equation from unity, $$1 - \cos a = 1 - \cos (b-c) + \text{versin } A \sin b \sin c \quad (6)$$

and, since $$1 - \cos a = \text{versin } a \text{ and } 1 - \cos (b-c) = \text{versin } (b-c),$$
$$\text{versin } a = \text{versin } (b-c) + \text{versin } A \sin b \sin c \quad (7)$$

but, $$\sin b \sin c = \tfrac{1}{2}\{\cos (b-c) - \cos (b+c)\} = \tfrac{1}{2}\{\text{versin } (b+c) - \text{versin } (b-c)\}$$

hence $$\text{versin } a = \text{versin } (b-c) + \tfrac{1}{2}\{\text{versin } (b+c) - \text{versin } (b-c)\}\text{versin } A \quad (8)$$

Passing now to the usual notation of the astronomical triangle shown in Figure 5, which is the spherical triangle on the celestial concave whose three vertices are, respectively, the pole of the heavens, the zenith of the observer, and the observed celestial body, if the angle A be represented by $t$, the hour-angle, that is, the angle at the pole included between the meridian of the observer and the hour-circle passing through the observed celestial body, then the side $a$ will represent the zenith distance $z$ of the observed celestial body, and the sides $b$ and $c$ may be taken to represent, respectively, the polar distance of the zenith and the polar distance of the observed celestial body, the first being equal to ninety degrees minus the latitude, $90°-L$, and the second to ninety degrees minus the declination, $90°-d$.

Equation (8), under this notation, takes the form $$\text{versin } z = \text{versin } (L \sim d) + \{\text{versin } [180° - (L+d)] - \text{versin } (L \sim d)\} \frac{\text{versin } t}{2} \quad (9)$$

or, putting for 2 its equivalent, which is versin 180°, $$\text{versin } z = \text{versin } (L \sim d) + \left\{\frac{\text{versin } 180° - (L+d) - \text{versin } (L \sim d)}{\text{versin } 180°}\right\} \text{versin } t \quad (10)$$

For solving a time-sight to find the hour-angle and hence the longitude, equation (10) may be rewritten, thus $$\text{versin } t = \frac{\{\text{versin } z - \text{versin } (L \sim d)\} \text{versin } 180°}{\text{versin}\{180° - (L+d)\} - \text{versin } (L \sim d)} \quad (11)$$

and, by analogy, for computing the azimuth, thus:

$$\text{versin } z = \frac{\{\text{versin } (90° \sim d) - \text{versin } (L \sim h)\} \text{versin } 180°}{\text{versin}\{180° - (L+h)\} - \text{versin } (L \sim h)} \quad (12)$$

in which Z represents the azimuth and $h$ represents the altitude or complement of the zenith distance, that is, $90°-z$, as shown in Figure 5.

The forms of expression given in equations (10), (11), and (12) serve also to find the distance, the difference in longitude, and the course in great circle sailing, by regarding $d$ as the latitude of the place of destination $t$ as the difference in longitude between the points of departure and destination, $z$ as the measure of the distance, and Z as the course from the position of the observer toward the place of destination.

Employing Cartesian rectangular coordinates, and letting $y = \text{versin } z$
$a = \text{versin } (L \sim d)$
$x = \text{versin } t$
$m = \dfrac{\text{versin } [180° - (L+d)] - \text{versin } [L \sim d]}{\text{versin } 180°}$ equation (10) will be transformed into $$y = a + mx$$

which is the equation to a straight line intersecting the axis of Y at a distance $a$ above the origin of coordinates and passing through the first quadrant at an angle of inclination to the axis of Y whose tangent is $m$.

If the axes Y and X be graduated on the same scale to represent the versines of angles, commencing with 0° at the origin designated by the letter O in Figure 6, and extending to 180° in each case, the line EF will be the graph of the equation, $y = a + mx$, and hence of equation (10).

The length of the ordinate to the line EF corresponding to any given value of $t$ on the scale, OX, of abscissae representing the values of versin $t$ will mark the value of $z$ on the scale, OY, of ordinates representing the value of versin $z$; and, conversely, the abscissa corresponding to any given value of $z$ (as when the altitude of a celestial body is measured in taking a time-sight) on the scale of ordinates, OY, will mark the value of the hour-angle $t$ on the scale of abscissae, OX.

In like manner, equation (12) for finding the azimuth Z in which Z appears in place of $t$ in equation (11) and the altitude, $h$, in place of the declination, $d$, may be represented by a straight line whose rectangular coordinates, as represented in Figure 7, are versin Z and versin $(90 \sim d)$ respectively, and whose inclination to the axis of abscissae in versin Z is an angle whose tangent is equal to $$\frac{\text{versin } [180° - (L+h)] - \text{versin } [L \sim h]}{\text{versin } 180°}$$

The necessity for drawing coordinates after the manner shown by the lines of fine dashes in Figures 6 and 7 may, to a large extent, be obviated by extending the ordinates from the division marks of the scales of versines constructed along OX and OY, and thus forming a square diagram as shown in Figure 8.

If the righthand border of this diagram be numbered in the reverse order from the lefthand border, that is, from 180° at the bottom to 0° at the top, the righthand ordinate will be $L+d$ in finding the hour-angle and zenith distance and $L+h$ in finding the azimuth instead of $180°-(L+d)$ and $180°-(L+h)$ as indicated in Figures 6 and 7 in these respective cases. Hence, the following rules provide for solving the equations (10), (11), and (12) to find, respectively, the zenith distance, the hour-angle or time-sight, and the azimuth, by means of the construction shown in Figure 8;

(a) To find the zenith distance, $z$, mark the value of $(L \sim d)$ on the lefthand border scale of versines and the value of $(L+d)$ on the righthand border scale of versines. The straight line drawn to connect these two markings is the graph of equation (10) representing the diurnal course of a celestial body whose declination is invariable between culmination on the upper branch of the meridian of the observer in latitude, L, and culmination on the lower branch of the same meridian. Mark the intersection on this graph of the vertical ordinate from the value of the hour-angle, $t$, found on the top or bottom border of the scale of versines. The horizontal line from this intersection will mark, on the lefthand scale, the value of the zenith distance, $z$.

(b) When the altitude, and hence the zenith distance, $z$, is known by measurement, by reversing the last two steps in (a), the hour-angle, $t$, may be found.

(c) To find the azimuth, Z, mark the value of $(L-h)$ on the lefthand border scale of versines, and the value of $(L+h)$ on the righthand border scale of versines. The straight line drawn to connect these two markings is the graph of equation (12). Mark the intersection on this graph with the horizontal line from the value of the polar distance, $(90°-d)$, found on the lefthand border scale of versines. The vertical ordinate from this intersection will mark, on either the top or bottom border scale, the value of the azimuth, Z.

In brief, these solutions consist in finding, in the form of a straight line connecting two points readily determined, the graph of the equation to be solved, whose coordinates, in terms of versines, are, in one case, hour-angle and zenith distance, and, in the other, azimuth and polar distance; so that, one of a pair being given, the value of the other would be indicated by the graph in its established relation to the bordering scale of versines.

The object of the present invention is to perform these solutions by means of mechanism designed to produce movements, according to the law of versines of angles throughout the range of from 0° to 180°, for placing in position a ruler whose fiducial edge shall represent the required graph, and yet further for measuring the coordinates, in terms of versines, of any point of the graph represented by the fiducial edge.

In a semicircle, if a radius be conceived to revolve from a position of coincidence with the diameter in one direction to a position in coincidence with the diameter in the opposite direction, the versine of the angle of removal of the radius from the initial position will be represented by the distance of removal from the extremity of the diameter at the origin of movement of the foot of the perpendicular let fall from the outer end of the revolving radius upon the diameter, as shown in Figure 9.

The motion of the foot of the perpendicular will be derived from that of the outer end of the revolving radius by the arrangement shown in Figure 10, in which P represents a small pin and block set in the outer end of a radius arm CP pivoted at the center of the graduated semicircular plate RPQ. Let the pin work in the slot EF whose direction is at right angles to the sliding bar QB which forms a part of the yoke EF. Of the components which combine to produce the circular motion of P, that which occurs in the direction EF is rendered inoperative, and the whole of the other is imparted to the bar QB which is confined to a rectilinear movement by the sides of the slide ST.

The mechanism whose principle is illustrated in Figure 10, being applied at the end-ordinates of the square forming the boundary of Figure 8, provides for determining the line of the graph of equation (10), or (11), or (12) by means of the fiducial edge of the bar or ruler pivoted to the head of one of the pair of members QB shown in Figure 10 and sliding over a support at the head of the other.

And, by means of a like mechanism placed in a position defined by the upper line of abscissæ of the square forming the boundary of Figure 8, the sliding bar of the versine mechanism may be moved to define the known abscissa of a point of the edge of the graph bar, whose other coordinate is then to be identified by the operation through contact with the graph bar, of the sliding mechanism carried by and fixed to the abscissa sliding bar, in a position at right angles to it at the point selected to mark the reading of abscissæ.

A practical mechanism for carrying into effect the principles set forth above is illustrated in Figures 1 to 4, inclusive, wherein members 10 and 11 are held in fixed parallel relation by a cross-member 12, preferably cast integrally therewith. Members 10, 11, and 12 are each formed with a longitudinally extending groove of dove-tail shape in cross-section as shown in detail in Figure 3, whereby the members can serve as guides for receiving and retaining the slides to be hereinafter described.

Each of the guide members has a semicircular plate 13 affixed to its under surface, such plate being graduated to indicate degrees, minutes, and seconds in a range of from 0° to 180° or in hours, minutes, and seconds throughout an equivalent range. The under surface of each guide member is cut away as at 14, Figure 3, and in such cut-out portion an indicator arm 15 is pivoted at its end by means of a screw or pin 16. Intermediate of its length each of the indicator arms is provided with a pivoted block or cross-head 17 which is received in a slot 18 formed in an integral part of the slide, and at right angles to the main body portion of the slide. Each of the slides is so formed that its upper surface lies in a plane above the shoulders of its respective guide, such shoulders being defined by the longitudinal groove therein. The integral right-angle extension of each slide is thinner than the slide of which it is a part, and is of such dimension that, when the slide is received in the longitudinal groove of its guide, the integral extension will rest upon, and ride along the shoulder of the guide member. Consequently, when the indicator arm is moved in a circular path about its pivot, its movement will cause a rectilinear movement of the slide to which it is attached.

A cross-member 19 is pivoted as at 20 to one of the parallel slides, its free end resting upon a pin 21, of semicircular cross-section provided in the other of said parallel slides and so mounted therein as to be allowed freely to revolve. The centers of pivot 20 and pin 21 are at a fixed and equal distance from the ends of the respective parallel slides. The cross-member 19 is provided with a ledge or angle of L-shape in cross-section, thus defining the portion 22 whose upper surface is in the same plane as the line connecting the centers of the pivot 20 and pin 21. To retain the free end of the cross-member 19 in a position to engage the pin 21 there is provided an overlying strap as is partially shown in Figure 1.

In the mechanism comprising my invention there are provided four dials and indicator arms with slides as described above, but inasmuch as all function in identically the same manner the description of one of them alone is deemed to be sufficient. It is to be understood that, in the practice of my invention, I do not limit myself to the specific form of indicator shown herein. A movable dial with vernier adjustment is considered as within the scope of this invention, but, since such adjustment is, in itself, old it has not been deemed necessary to illustrate it as applied to the mechanism herein described.

The slide 23 which moves in guide member 12 has a pair of spaced blocks or guides 25 affixed thereto, as by pins 24. Each of these blocks forms an integral part of an upright guide member 26, or are permanently attached thereto whereby, upon rectilinear movement of the slide 23, the blocks 25 and guide member 26 will be carried along the guide 12. A slide 27, with a right angle extension at its end similar to the other slides hereinbefore described, is mounted in a longitudinal groove formed in the guide 26 and defined by the spaced blocks 25, as shown in detail in Figure 4. The slide 27 carries, at its lower end, a bearing block or wheel 28 which contacts with the ledge 22 of the cross-member 19.

In the use of the instrument, assuming that the hour-angle and latitude are known and it is desired to find the zenith distance of a celestial body of given declination, the values $(L \sim d)$ and $(L+d)$ being known values are indicated by moving the arms 15 which are pivoted to the parallel guides, the hand on the left to indicate the value $(L \sim d)$ in terms of degrees, minutes, and seconds, and the hand on the right to indicate the value $(L+d)$ in the same manner. The upper surface of ledge 22 mechanically represents the graph of equation (10) representing the diurnal course of a celestial body whose declination is invariable between culmination on the upper branch of the meridian of the observer in latitude L, and culmination on the lower branch of the same meridian. The indicating arm which controls movement of the slide 23 is then moved to indicate the value of the hour-angle. Movement of the slide 23 toward the right, as seen in Figure 1, results in a camming action of the roller or bearing on the end of slide 27 against the inclined face of ledge 22 thereby moving the slide 27 in its guide 26 and rotating the indicator arm 15 which is attached thereto to mechanically indicate the zenith distance in degrees, minutes, and seconds as read from the dial underlying the indicator arm.

Similarly, to find the azimuth, the value $(L-h)$ is indicated by moving the indicator arm 15 over the lower left hand scale, and the value $(L+h)$ by moving the arm 15 over the lower righthand scale. The plane of the upper surface of ledge 22 thereby indicates the graph of equation (12). The slide 23 having been moved to its extreme position on the side of the lesser end-ordinate of the graph bar, the indicator arm actuating slide 27 is then set to indicate the value of the polar distance, $(90°-d)$, and, this being done, the slide 23 is then moved, by rotation of the indicator arm attached thereto, until the roller 28 of the slide 27 contacts with the ledge 22. At this point the indicator arm attached to the slide 23 will overlie the scale 13 at the point which directly indicates the value of the azimuth.

When the altitude, and hence the zenith distance, is known by measurement, the parallel slides being set for $(L \sim d)$ and $(L+d)$ as already described in finding the zenith distance, the hour-angle may be found by moving slide 23 to its extreme position on the side of the lesser end-ordinate of the graph bar, by next setting, to the value of the zenith distance, the indicator arm which is attached to the slide 27, and finally moving the slide 23 by rotation of the indicator arm attached thereto, until the roller 28 of slide 27 contacts with the ledge 22. At this point the indicator arm attached to slide 23 will overlie the scale 13 at a point which directly indicates the value of the hour-angle.

Having now described my invention consisting of an instrument for mechanically indicating the solution of spherical triangles, including the solution of the astronomical triangle for such parts as are commonly required for finding loci of geographical position in the practice of the art of navigation, what I claim and desire to secure by Letters Patent, is:

1. An instrument for mechanically determining the zenith distance or co-altitude and the azimuth that a celestial body would have in a certain geographical position at any predetermined instant of time comprising a member positioned to represent the graph of the diurnal path of a celestial body as a straight line, means for positioning said member, and means cooperating with said member by contact therewith whereby from the known coordinate of any point in the diurnal path the unknown coordinate can be found.

2. Means for defining a graph of the diurnal path of a celestial body as a straight line, and means movable along said first-named means and adapted to contact therewith in any predetermined position whereby from one coordinate of each pair of coordinates of a point of the path the other coordinate of the path is mechanically found.

3. An instrument for mechanically determining the hour-angle that a celestial body of known declination would have at an ascertained altitude above the horizon in a given latitude comprising a member having a fiducial edge positioned to represent the graph of the diurnal path of a celestial body as a straight line, means for positioning said member, and means adapted to contact the fiducial edge thereof whereby from the known coordinate of any point of the diurnal path the unknown coordinate can be found mechanically.

4. Means for finding the quantities used in defining the locus of geographical position comprising mechanism designed to produce movements to represent the versines of angles ranging from 0° to 180°, a member having a fiducial edge positioned by such movements, and means cooperating with said member by contact therewith for measuring, in terms of versines of angles, the coordinates of any point of the graph represented by the fiducial edge of said member.

5. A mechanism for solving spherical triangles in which the three sides or the three angels are given, or in which two sides and their included angle, or two angles and the side between them are given, comprising parallel independently adjustable ordinate members operable to represent the versines of angles; a connecting member pivoted to one of said ordinate members and having a fiducial edge; means carried by the other of said ordinate members for supporting the free end of said connecting member in different positions; a slide transverse to said ordinate members operable to represent the versines of angles; a further ordinate member operable to represent the versines of angles carried by said slide and movable therewith, said last-named ordinate member being adapted to contact with said connecting member along its fiducial edge.

6. Mechanism for solving spherical triangles comprising spaced parallel guides, slides in each of said guides, the said slides each being formed with an extension at right angles thereto, slotted for the reception of a pivot member, an indicator arm pivoted to each of said guides and provided with pivot means engaging in the slotted extension of the respective slides whereby, upon rotation of said indicator arm about its pivot its movement will be translated into a rectilinear movement of the slide to which it is attached, such rectilinear movement representing the versines of the angles of rotation; a member having a fiducial edge, pivoted adjacent one end to one of said slides, a projection on the other of said slides for receiving and supporting the free end of said member; a third guide and slide at right angles to said parallel guides and slides, a fourth guide and slide carried by said third slide, said last-named slide being adapted to make contact with the fiducial edge of the pivoted member and carrying means for indicating, in terms of versines of angles, its position at any point along the said fiducial edge of the pivoted member.

7. An instrument for finding the quantities used in determining the locus of geographical position comprising a graph bar positioned to define the diurnal path of a celestial body as a straight line, means for positioning said bar, and means cooperating with said bar for indicating the coordinates of any point of the graph represented by said bar.

In testimony whereof I affix my signature.

GEORGE W. LITTLEHALES.